Jan. 9, 1934.  J. ROBINSON  1,942,939
AUTOMATIC TRAIN PIPE COUPLING HEAD
Original Filed May 27, 1929  2 Sheets-Sheet 1
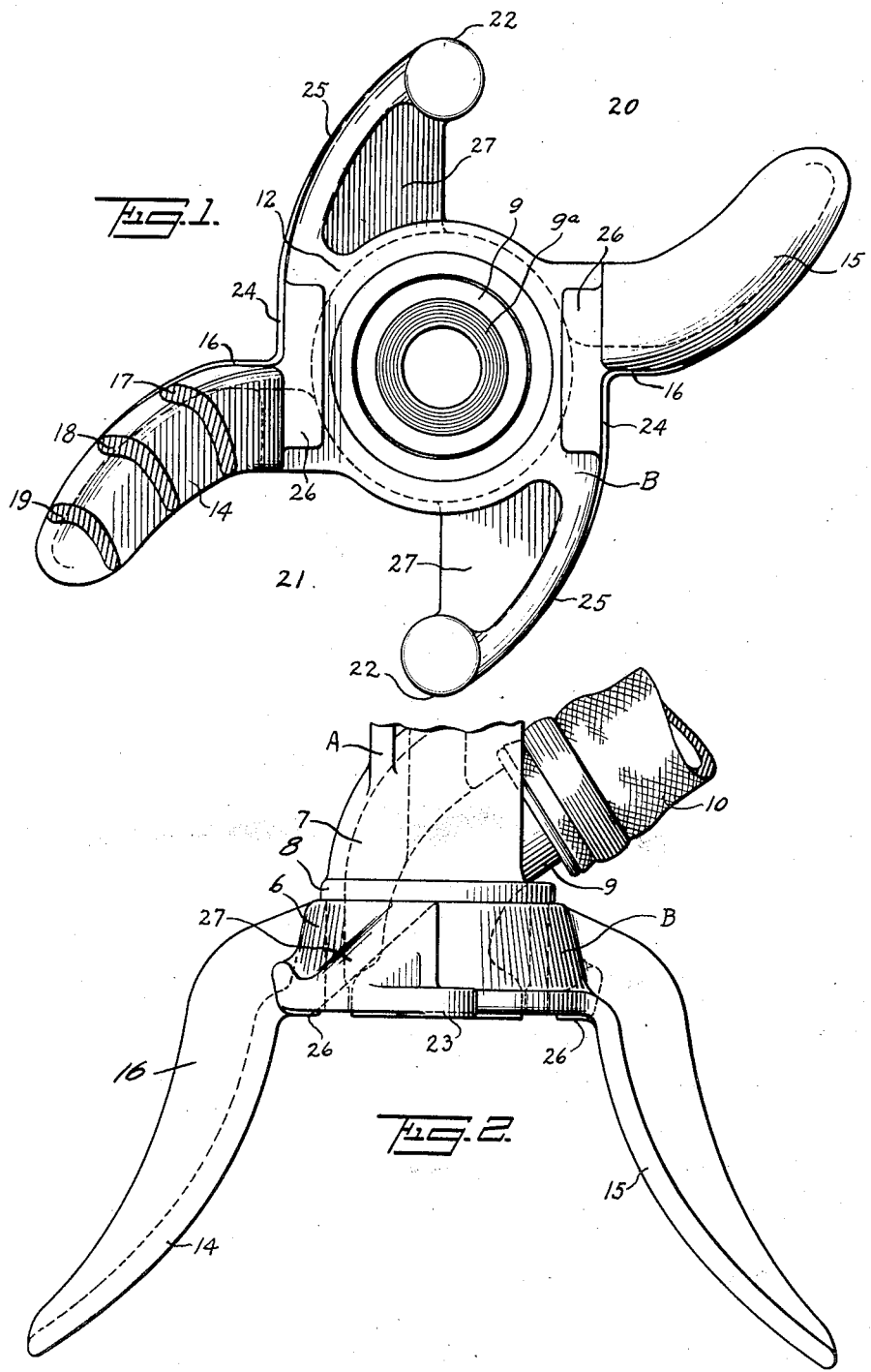

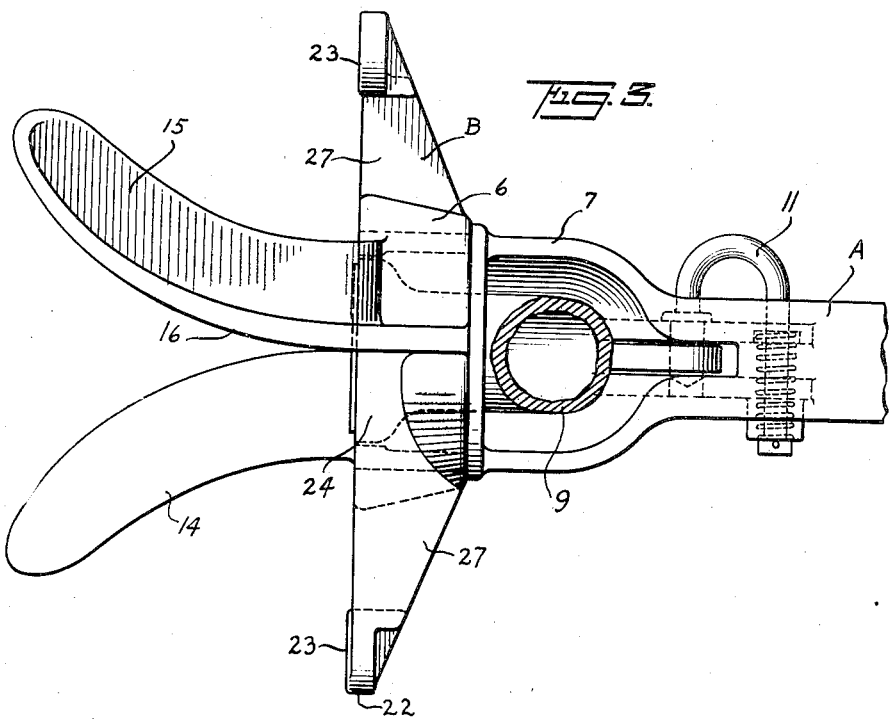
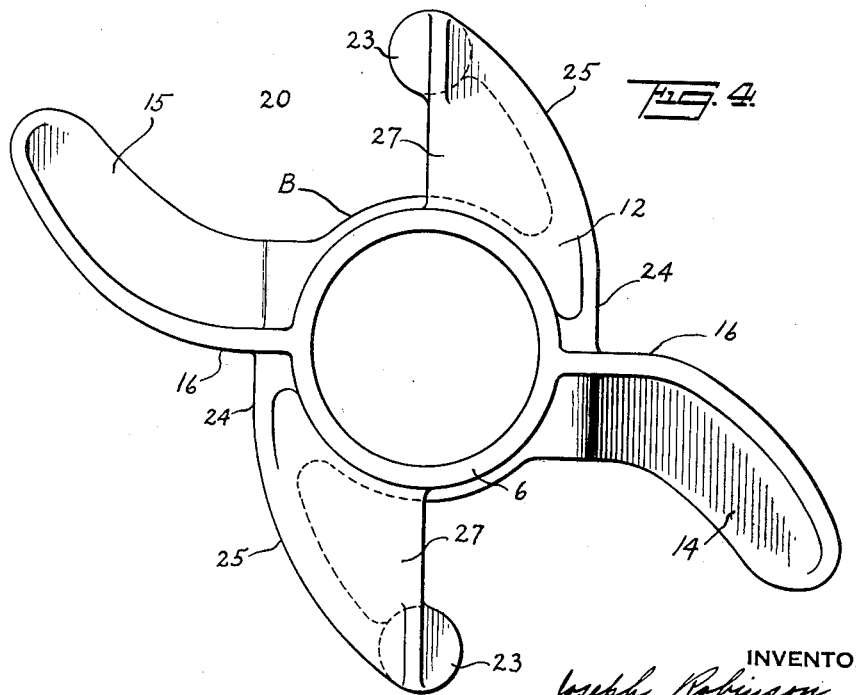

Patented Jan. 9, 1934

1,942,939

UNITED STATES PATENT OFFICE 1,942,939

AUTOMATIC TRAIN PIPE COUPLING HEAD

Joseph Robinson, New York, N. Y., assignor of one-half to Roy M. Wolvin, Montreal, Quebec, Canada Application May 27, 1929, Serial No. 366,441
Renewed May 16, 1933

10 Claims. (Cl. 285—58)

This application relates to improvement in automatic train pipe connectors, and particularly to the coupling head of such connectors. Among the objects are those recited in the specification of my co-pending application Serial #363,507 filed May 16th, 1929 for similar improvements in automatic train pipe coupling heads. Other objects of the present invention are to improve the construction disclosed in that co-pending application by cutting away more of the portion 10 of the coupling head in that application; by turning or inclining the portions 9 and 10 of that application rearwardly, and by giving to the guides or wings of the head a spiral shape from a point near their base forwardly to their outer ends whereby the inside guiding faces of the prongs gradually curve toward the horizontal plane. This conformation of the wings materially improves coupling of the heads under adverse lateral and vertical conditions.

In the drawings, Figure 1 is a front elevation of my improved coupling head;

Figure 2 is a plan view thereof. In this view the forward end of the supporting member or carrier A and the train pipe hose and conduit 9 are shown in the service position;

Figure 3 is a side elevation of my improved coupling head and the forward end of the yoke or carrier. In this view a part of the conduit and carrier are broken away. The spring actuated latch 11 for holding the conduit in place is clearly illustrated in this view, and Figure 4 is a rear elevation of my improved coupling head. In this view the conduit and the carrier or pipe are omitted.

Any suitable carrier A such as that illustrated in my co-pending application Serial #488,373 filed July 29th, 1921 now Patent No. 1,787,122 of Dec. 30, 1930 for improvements in Automatic train pipe connectors, may be used to carry my improved coupling head B, and this carrier may of course be attached to the head in any desired manner. I illustrate it pressed into and through a shank 6 of the head. The carrier A has a hollow forward end 7 around which extends an annular collar or other form of stop 8 for limiting the projection of the pipe into the shank 6. Within the hollow portion 7 of the carrier I removably mount a suitable tubular conduit 9 to which is attached in any desired manner the customary train pipe hose 10 and carries a suitable gasket 9ª preferably of the expansible type. A spring actuated latch 11 such as shown in my co-pending application Serial 360,195 filed May 3rd, 1929 now Patent No. 1,908,866 of May 16, 1933, for improvements in Automatic train pipe connectors, may be used to anchor the conduit in the carrier. Of course the conduit may be otherwise anchored therein if desired.

My improved coupling head B comprises a base 12 generally oval in outline. Diagonally spaced forwardly extending outwardly and upwardly diverging wings or guides 14 and 15 are suitably secured to the base, or they may be formed integral therewith. As shown in Figure 1 the guiding edges 16 of these wings lie in approximately the horizontal plane at the point where the wings join the base, and that these edges turn upwardly from that point forward to the outer end of the wing. At 17, 18 and 19 in Figure 1 this turning over or spiral shape of the wings is clearly illustrated. The object is to facilitate coupling of the heads when one head is considerably higher than the other and at the same time on an abrupt curve or under other lateral displacement. Moreover the arrangement gives a wide bearing or guiding edge 16 throughout practically the entire length of the wing which minimizes wear on the wings in coupling and also minimizes wedging or jamming of the wings against mating surfaces on a mating head. At 20 and 21 the base 12 of the head is cut away from a point adjacent said guides 14 and 15 to approximately the major axis or vertical center line of the base, and vertically to approximately the respective ends 22 of the base, which said respective ends comprise or include forwardly projecting bearing points 23 preferably circular in outline. The guiding edges 16 of the wings lie slightly above and below the transverse center line of the coupling head, as shown in Figures 1 and 3 and they join aligning surfaces 24 located at opposite sides of the head and which extend vertically parallel to the major axis of the head for a short distance and then curve inwardly as at 25 to meet the aforesaid major axis of the head and to join the bearing points 23 at a considerable distance from the transverse center of the head B. The central bosses 26, on opposite sides of the opening in the head, also constitute bearing points and are in the same vertical plane as the bearing points 23. Preferably these four bearing points 23 and 26 are equidistantly spaced on the head, and they serve to keep the faces of the head slightly apart to permit inspection of the gaskets between coupled heads without first separating the latter. It will be understood of course that the conduit 9 is removably mounted in the hollow 7 of the carrier A to permit renewal of the gasket 9ª while the heads remain coupled. The edges 16 of the wings or prongs 14 and 15 of the head are quite wide where they join the base 12 and since these edges terminate in the shank 6 they form strengthening ribs or braces for the wings and the head.

A particularly novel feature of my improved coupling head resides in the fact that the portions 27 thereof are inclined rearwardly, as shown particularly in Figures 1 and 2. With this arrangement when mating coupling heads meet there is not only the opening formed by the cut away portions 20 and 21 for the exit of snow and ice, but also the opening formed by setting or angling the walls 27 rearwardly from the vertical plane occupied by the bosses 23 and 26, as indicated in said Figures 1 and 2. The walls 27 are thrown or inclined rearwardly from the face of the head from a point near the vertical edges 24 and extend to the rear of the shank 6. The result is that when two of my improved coupling heads are coupled there is a wide opening or space between these flanges or walls 27 of opposing heads, thus affording an unobstructed easy exit for snow and ice in addition to the cut away portions 20 and 21. It will be observed from Figures 1 and 3 that the cut away portions mentioned extend vertically toward the center of the coupling head as far as possible and yet leave a proper thickness for the required strength in the shank 6, and also that the walls or portions 27 lie in a plane at an angle to the face of the coupling head and turn inwardly towards the major axis of the head as they leave the shank 6—see particularly Figures 1 and 2—and that they preferably are curved where they join the edges 25.

My improved coupling head may be considered as an aligning or centering device for the carrier A on which the head B is suitably mounted, the gasket carrying conduit 9 being removably supported in the head at approximately the center of the latter, and the cut away portions 20 and 21 being provided to prevent interference, by snow or ice, with the proper operation of the carrier and the conduit. The cut away portion narrows the wings 14 and 15.

I am aware that changes may be made in my improved coupling head without departing from the spirit and scope of this invention. I therefore do not desire to be limited to the particular embodiment illustrated and described.

What I claim is:

1. An automatic train pipe coupling head, comprising a base provided with suitable guiding means, a part of said guiding means comprising vertically extending inwardly curved portions a part of the front surface of which is positioned rearwardly and inclined with respect to the coupling face of said head.

2. An automatic train pipe coupling head, comprising a base provided with diagonally spaced forwardly extending, outwardly diverging guiding prongs, and having also supplemental guiding portions which extend vertically and curve inwardly toward the major axis of said head, said portions having a part of the front surface thereof positioned rearwardly of and inclined with respect to the coupling face of said head.

3. An automatic train pipe coupling head, comprising a base having thereon diagonally spaced forwardly extending outwardly diverging guiding prongs, one of said prongs being above and the other below the transverse center line of said head, and said base being provided between said guides with an aligning portion which extends vertically and thence curves inwardly to approximately the major axis of said head 6 to constitute supplemental lateral guiding means for said head, said inwardly extending portion being supported by a wall lying between said portion and the central part of said head, said wall being disposed in a plane at an angle to the plane of the coupling face of said head.

4. An automatic train pipe coupling head, comprising a base provided with suitable guiding means and having a shank, a part of said guiding means including portions at the sides of said base and which extend substantially vertically and thence curve inwardly toward the major axis of said base, one end of said portions being joined to said shank by a wall which extends from approximately the coupling face of said head rearwardly to approximately the rear end of said shank and at an angle to the plane occupied by the coupling face of said head.

5. An automatic train pipe coupling head, comprising a base provided with diagonally spaced forwardly extending outwardly diverging guiding prongs, the inner guiding surface of which turn inwardly toward a horizontal plane from approximately the base of said prongs to the outer ends thereof.

6. An automatic train pipe coupling head, comprising a base substantially oval shaped, and guides rigidly secured thereto on each side of the major axis of the base and approximately midway of the length thereof, the guiding surfaces of the guides facing in opposite directions, the edge of the base below one of said guides and on the same side of the major axis of said base as is located said guide being curved inwardly and constituting a guiding edge for the guide of a mating head, the edge of the base above the other of said guides and on the same side of the major axis of said base as said other guide is located being curved inwardly and constituting a guiding edge for the guide of a mating head, the base being cut away above said first named guide on said base and below said second named guide on said base along a line extending substantially from the edge of said guides to approximately the major axis of the base and thence substantially along said axis vertically to approximately the ends of the base, a part of the wall of said base directly opposite said cut away portion being positioned rearwardly away from the plane of the coupling face of said head.

7. An automatic train pipe coupling head, comprising a base of generally oval form, said base having an upwardly extending portion above the horizontal center line thereof, which portion is curved inwardly to approximately the major axis of the head, said head also having a downwardly extending portion on the other side of the major axis thereof which extends inwardly to substantially the major axis, said upwardly extending portion of the head and said downwardly extending portion thereof each having a front surface which is positioned rearwardly of the coupling face of the head and inclined rearwardly with respect to said coupling face.

8. An automatic train pipe coupling head comprising a base having a coupling face arranged substantially at right angles with the longitudinal direction of the coupling head, guiding means secured to opposite sides of said head, said head on one side thereof having a front surface which is inclined rearwardly and inwardly toward the vertical center line of the head, and also having on the other side a surface which is inclined rearwardly and inwardly toward the vertical center line of the head.

9. An automatic train pipe connector head having a base substantially oval in outline, a guide projecting laterally from one side of said base, said head below said guide having a front surface which is inclined rearwardly and inwardly toward the vertical center line of the head, a guide projecting laterally from the other side of said base, said head above said second guide having a surface which is inclined rearwardly and inwardly toward the center line of the head.

10. An automatic train pipe connector head having a base substantially oval in outline, a guide projecting laterally from one side of said base, said head below said guide having a front surface which is inclined rearwardly and inwardly toward the vertical center line of the head, a guide projecting laterally from the other side of said base, said head above said second guide having a surface which is inclined rearwardly and inwardly toward the center line of the head, said head above said first guide and below said second guide being cut away substantially up to the vertical center line of the head.

JOSEPH ROBINSON.